(12) United States Patent
Ku et al.

(10) Patent No.: US 7,903,299 B2
(45) Date of Patent: Mar. 8, 2011

(54) SCANNER CAPABLE OF SELECTING SCANNING POSITIONS AND SCANNING METHOD FOR THE SCANNER

(75) Inventors: Jeau-Jeau Ku, Hsinchu (TW); Liang-Wen Yeh, Hsinchu (TW)

(73) Assignee: Avision Inc. (TW)

( * ) Notice: Subject to any disclaimer, the term of this patent is extended or adjusted under 35 U.S.C. 154(b) by 288 days.

(21) Appl. No.: 11/954,224

(22) Filed: Dec. 12, 2007

(65) Prior Publication Data

US 2008/0158623 A1 Jul. 3, 2008

(30) Foreign Application Priority Data

Jan. 2, 2007 (TW) .............................. 96100117 A

(51) Int. Cl.
*H04N 1/04* (2006.01)
(52) U.S. Cl. ......... 358/486; 358/461; 358/463; 358/465; 358/496; 358/474
(58) Field of Classification Search .................. 358/486, 358/488, 461, 496, 498, 463, 465, 466, 3.26; 399/361, 367, 379
See application file for complete search history.

(56) References Cited

U.S. PATENT DOCUMENTS

| | | | |
|---|---|---|---|
| 5,930,008 A * | 7/1999 | Nabeshima et al. | 358/496 |
| 6,563,938 B1 * | 5/2003 | Harada | 382/108 |
| 6,600,579 B1 * | 7/2003 | Kumagai et al. | 358/474 |
| 6,839,153 B1 * | 1/2005 | Shimizu | 358/3.21 |
| 7,212,320 B2 * | 5/2007 | Imoto | 358/497 |
| 7,450,279 B2 * | 11/2008 | Hiromatsu et al. | 358/505 |
| 7,589,871 B2 * | 9/2009 | Yoshimoto et al. | 358/496 |
| 7,616,351 B2 * | 11/2009 | Higashitani | 358/461 |
| 7,630,102 B2 * | 12/2009 | Kurokawa | 358/474 |
| 2002/0159100 A1 * | 10/2002 | Okutomi et al. | 358/497 |
| 2004/0066539 A1 | 4/2004 | Chang | |
| 2005/0179954 A1 * | 8/2005 | Arai et al. | 358/3.26 |

FOREIGN PATENT DOCUMENTS

TW 408553 10/2000

\* cited by examiner

*Primary Examiner* — Cheukfan Lee

(57) ABSTRACT

A scanner capable of selecting scanning positions includes a scanning window, a scanning module and a control processing unit. Before a sheet of documents is scanned, the control processing unit moves the scanning module to a first location to generate a first image datum, and moves the scanning module to a second location to generate a second image datum. The control processing unit compares both the image data according to differences between the first and second image data, and moves the scanning module to a scanning location for scanning the sheet of document.

16 Claims, 5 Drawing Sheets

US 7,903,299 B2

SCANNER CAPABLE OF SELECTING SCANNING POSITIONS AND SCANNING METHOD FOR THE SCANNER

BACKGROUND OF THE INVENTION

1. Field of the Invention

The present invention relates to a scanner and a scanning method for the scanner, and more particularly, to a scanner capable of selecting scanning positions and a scanning method for the scanner for preventing dust grains from affecting scanned images and for improving a scanning quality of the scanner.

2. Description of the Prior Art

Scanners are primary document processing devices in modern societies, particularly sheet-fed scanners, which are popular for scanning stacks of documents. Differing from the sheet-fed scanner, the flatbed scanner can merely scan one sheet of document in each scan, and it indicates a fact that after a first sheet of document is scanned, a second sheet of document cannot be scanned until the first sheet is removed or replaced, so that the flatbed scanner is troublesome in scanning a large number of documents. On the contrary, the sheet-fed scanner provides an automatic sheet-feeding mechanism, with which the sheet-fed scanner conveys a stack of sheets of documents one by one to a scanning position automatically and scans the stack of sheets consecutively. Therefore, the sheet-fed scanner is easy for usage, and saves much time of users.

However, for a sheet-fed scanner, or even for a flatbed equipped with an automatic document feeder, an interior scanning module is fixed at a same location for scanning documents. Therefore, when being scanned, sheets of documents are fed into the scanner one by one by the sheet feeder, and each sheet of document is moved across a scanning window, which is located corresponding to the scanning position of the scanning module. However, when such a scanner has dust grains on the scanning window, the dust grains are scanned along with the documents so that image data generated have unexpected lines, which do not exist on said documents. That is, the scanning quality of the scanner is affected by the dust grains.

Though decreasing the amount of dust grains around the scanner may reduce the effect of the dust grains, however, some tiny materials such as tiny dust grains, flakes, or hairs are hard to be removed and avoided. It is more troublesome when such tiny materials adhere to the under side of the scanning window. Moreover, the cleaner the surroundings for the manufacturing of the scanner are, the cost for the production of the scanner gets higher, and a scanner having a higher resolution requires cleaner surroundings. Instead of spending such a huge cost in cleaning surroundings for the manufacturing of the scanner, the scanning mechanism of the scanner is more worthy of being improved for refining the scanning quality.

Please refer to FIG. 1, which is a simplified diagram of a conventional sheet-fed scanner 100. The sheet-fed scanner 100 includes a housing 110, a sheet-in tray 115, a sheet-out tray 116, a stepper motor 130, a roller 125, a transparent platform 135, a light source 140, a memory 150, a control circuit 155, and a scanning module 145.

The sheet-in tray 115 is connected to the housing 110 for storing a stack of to-be-scanned documents 120. The sheet-out tray 116 is also connected to the housing 110 for storing a stack of scanned documents 121. The stepper motor 130 is disposed interior to the housing 110 for rotating the roller 125 to move the to-be-scanned documents 120 into the housing 110 one by one. The control circuit 155 is utilized for manipulating the scanner 100. The scanning module 145 is disposed interior to the scanner 100 for scanning the to-be-scanned documents 120 to generate image data of said to-be-scanned documents 120. The light source 140 provides light required in scans. The memory 150 is utilized for storing the generated image data. The scanning module 145 is located at a scanning position. When the roller 125 moves a sheet of the to-be-scanned documents 120 across the scanning position, the scanning module 145 scans the sheet of the to-be-scanned documents 120, and stores an image datum generated by scanning the sheet of the to-be-scanned documents 120 into the memory 150.

The scan procedure implemented on the sheet-fed scanner 100 includes steps as follows:

Step 00: Load the to-be-scanned documents 120 in the sheet-in tray 115 of the sheet-fed scanner 100.

Step 05: Initiate the scan procedure for the to-be-scanned documents 120.

Step 10: Control the stepper motor 130 to rotate the roller 125 for moving sheets of the to-be-scanned documents 120 to the transparent platform 135.

Step 15: Control the scanning module 145 with the control circuit 155 to scan sheets of the to-be-scanned documents 120 when the roller 125 moves the to-be-scanned documents 120 sheet by sheet across the scanning position, and store image data of the to-be-scanned documents 120 into the memory 150.

Step 20: Repeat Step 10 and Step 15 until all sheets of the to-be-scanned documents 120 are scanned.

In the scan procedure, the scanning module 145 scans the to-be-scanned documents 120 sheet by sheet at a same location, i.e., the scanning position of the scanning module 145 for scanning the to-be-scanned documents 120 is fixed. Therefore, when there are dust grains 180 at the scanning position of the scanning module 145 on the transparent platform 135, there are corresponding lines on the generated image data.

Please refer to FIG. 2, which is a diagram of an image datum 220 when there is a dust grain 180 at the under side of the transparent platform 135 of the sheet-fed scanner 100. As illustrated in FIG. 2, there is a line 280 on the image datum 220. The line 280 results from the fact that when a sheet of the to-be-scanned document 120 is moved across the transparent platform 135, the dust grain 180 keeps on preventing lights from passing through and results in a corresponding shadow in the scan. If the dust grain 180 is removed at the scanning position, the line 280 disappears too. Therefore, the scanning quality of the sheet-fed scanner 100 is severely affected by the dust grain 180 adhering to the transparent platform 135.

SUMMARY OF THE INVENTION

The claimed invention discloses a scanning method for a scanner capable of selecting scanning positions. The scanning method comprises moving a scanning module to a first position to generate a first image datum, moving the scanning module to a second position to generate a second image datum, comparing the first image datum with the second image datum for calculating a difference between the first image datum and the second image datum, and scanning a document with the scanning module according to the calculated difference between the first image datum and the second image datum.

The claimed invention also discloses a scanner capable of selecting scanning positions. The scanner comprises a housing, a scanning window disposed on the housing, a scanning module disposed interior to the housing, in a movable manner, and a control processing unit for controlling the scanning module and for processing a plurality of generated image data corresponding to a plurality of scanning positions. When the scanning module is moved to the plurality of scanning positions, the corresponding plurality of image data is generated. The control processing unit compares the plurality of generated image data, calculates differences between said plurality of generated image data, and moves the scanning module to a scanning position for scanning a document passing by the scanning window according to the calculated differences between said plurality of generated image data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
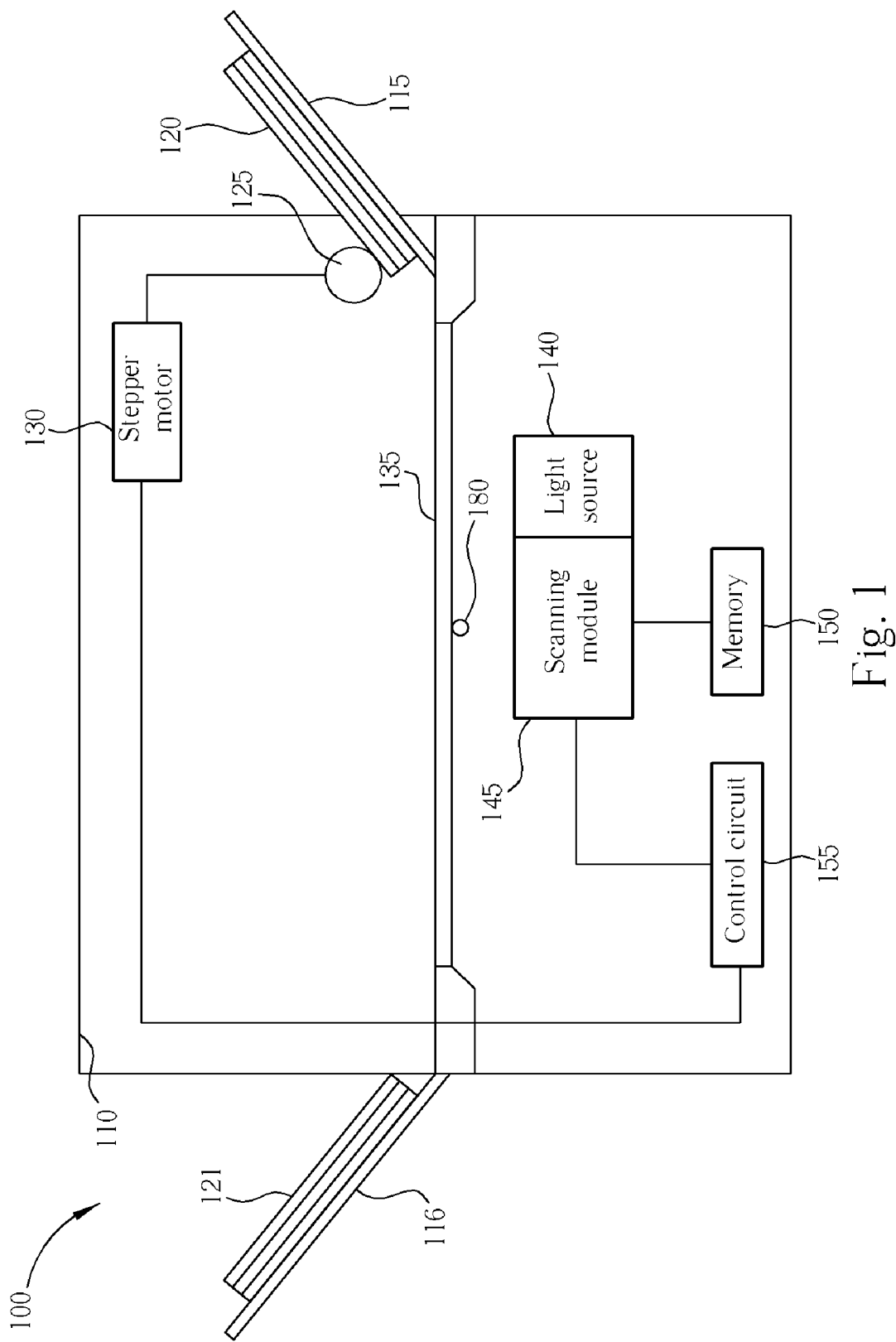
FIG. 1 is a simplified diagram of a sheet-fed scanner of the prior art.
Figure 2:
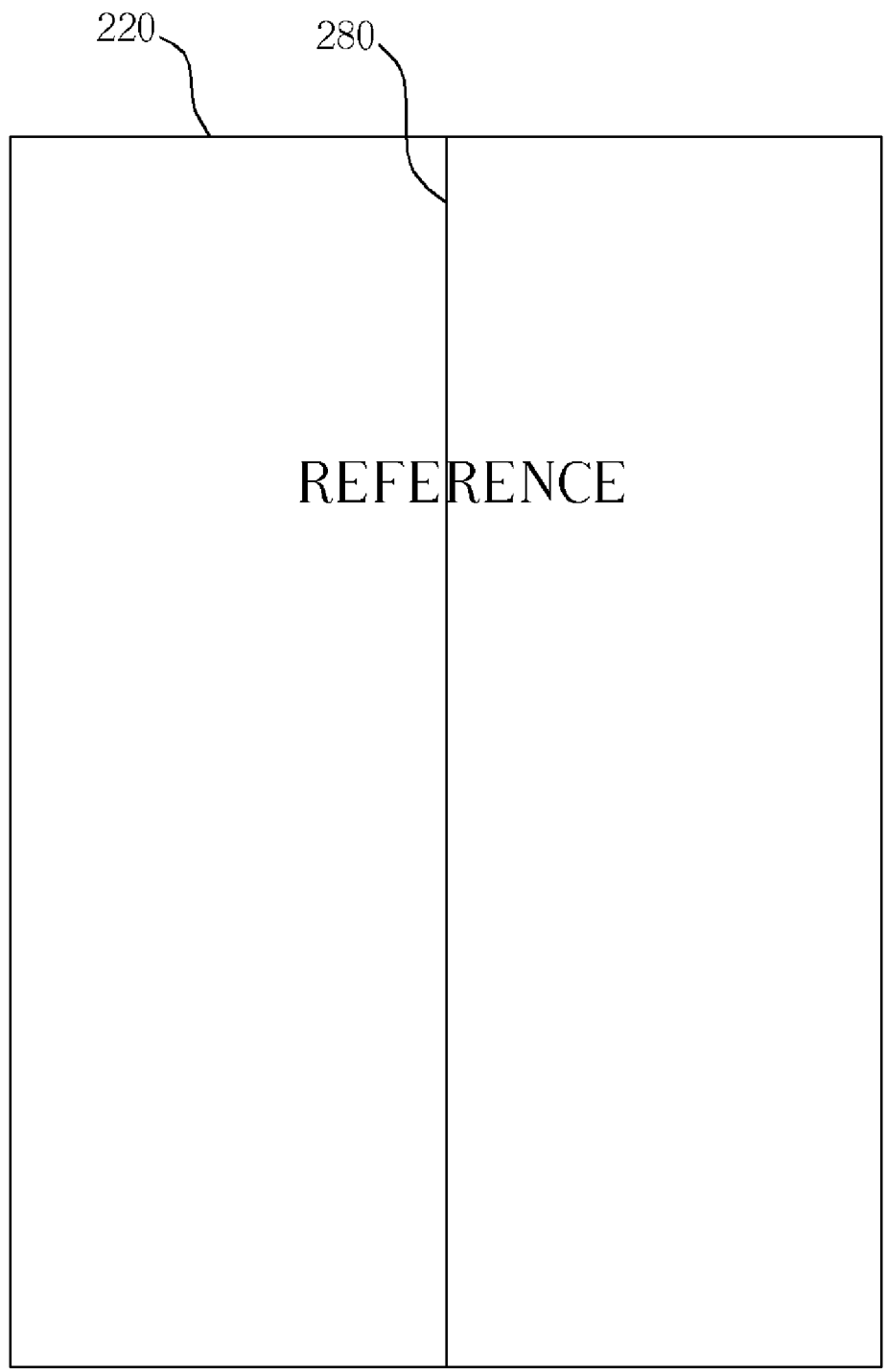
FIG. 2 is a diagram of an image datum when there is a dust grain at the under side of the transparent platform of the sheet-fed scanner shown in FIG. 1.
Figure 3:
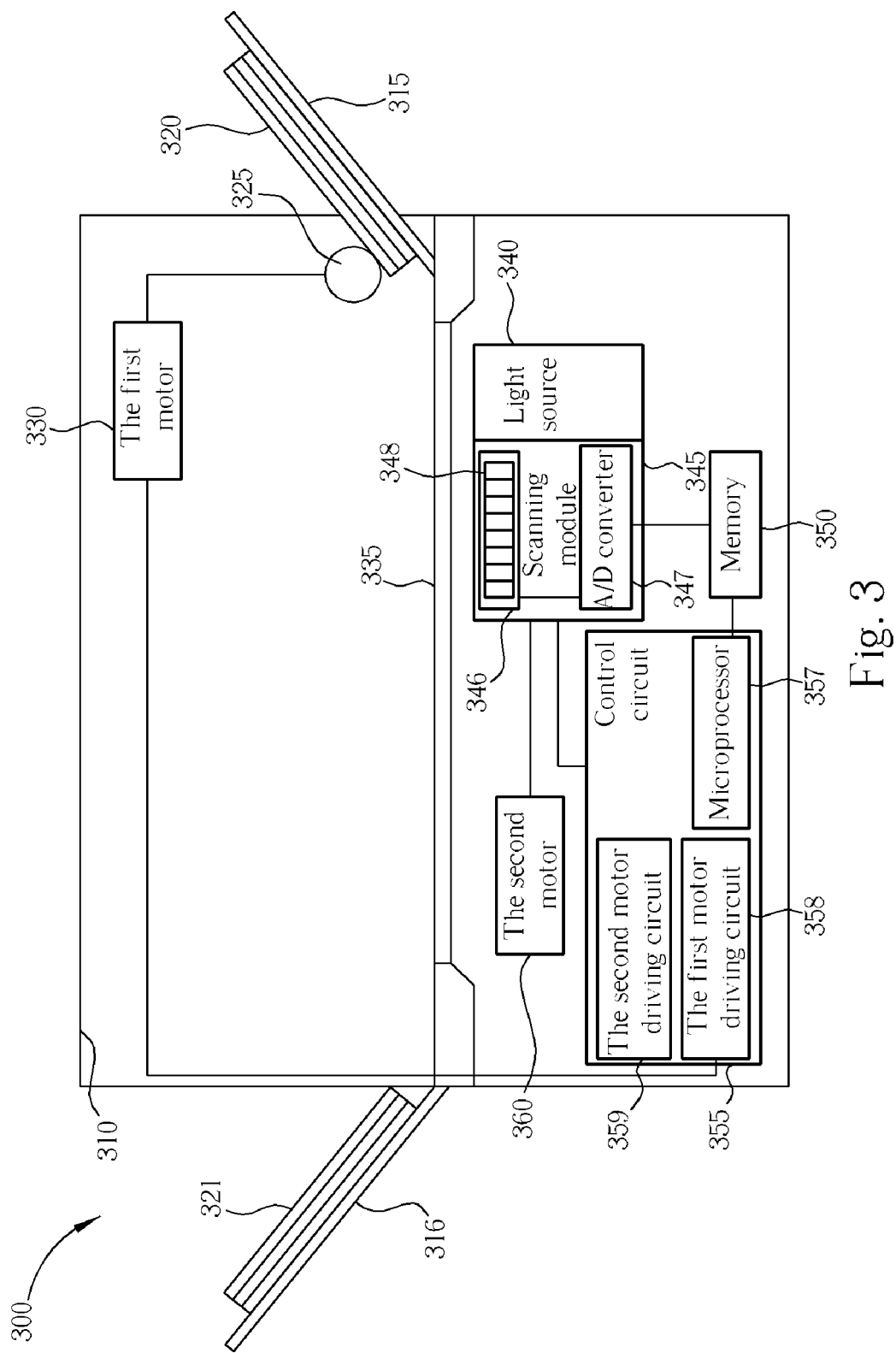
FIG. 3 is a diagram of a scanner according to a preferred embodiment of the present invention.

Please refer to FIG. 3, which is a diagram of a scanner 300 according to a preferred embodiment of the present invention. The scanner 300 includes a housing 310, a sheet-in tray 315, a sheet-out tray 316, a roller 325, a first motor 330, a transparent platform 335, a light source 340, a scanning module 345, a memory 350, a control circuit 355, and a second motor 360.

The first motor 330 is disposed interior to the housing 310 for rotating the roller 325 to move the to-be-scanned documents 320 to the transparent platform 335. The second motor 360 is disposed interior to the housing 310 for moving the scanning module 345. In an embodiment of the present invention, functions of the first motor 330 may directly be completed by the second motor 360, and vice versa. The sheet-in tray 315 is connected to the housing 310 for storing a stack of the to-be-scanned documents 320. The sheet-out tray 316 is also connected to the housing 310 for storing a stack of scanned documents 321. The light source 340 is disposed interior to the housing 310 for providing required lights for scanning. The memory 350 is disposed interior to the housing 310 for storing generated image data of the stack of to-be-scanned documents 320.

The scanning module 345 includes a photoelectric transforming element 346 and an analog-to-digital converter 347. The photoelectric transforming element 346 includes a plurality of light sensing units 348, which is disposed in a straight line substantially perpendicular to a direction of movement of the scanning module 345. Each of the plurality of light sensing units 348 is for receiving lights, which are then transformed into corresponding analog image data by the photoelectric transforming element 346. The analog-to-digital converter 347 is coupled to the photoelectric transforming element 346 for transforming the analog image data into corresponding digital image data, which are then stored in the memory 350.

The control circuit 355 includes a microprocessor 357, a first motor driving circuit 358, and a second motor driving circuit 359. The microprocessor 357 is for comparing digital image data stored in the memory 350 to generate a difference value, and for comparing the difference value with a predetermined critical value to determine whether the current scanning position of the scanning module 345 is appropriate for scanning the to-be-scanned documents 320. The first motor driving circuit 358 is for driving the first motor 330 to rotate the roller 325 to move the to-be-scanned documents 320. The second motor driving circuit 359 is for driving the second motor 360 to move the scanning module 345. Moreover, the microprocessor 357 controls the second motor driving circuit 359 to drive the second motor 360 to move the scanning module 345 until the scanning module 345 reaches an appropriate scanning position. After the scanning module 345 reaches the appropriate scanning position, the microprocessor 357 controls the first motor driving circuit 358 to drive the first motor 330 to rotate the roller 325 to move the to-be-scanned documents 320 for being scanned.

Figure 4:
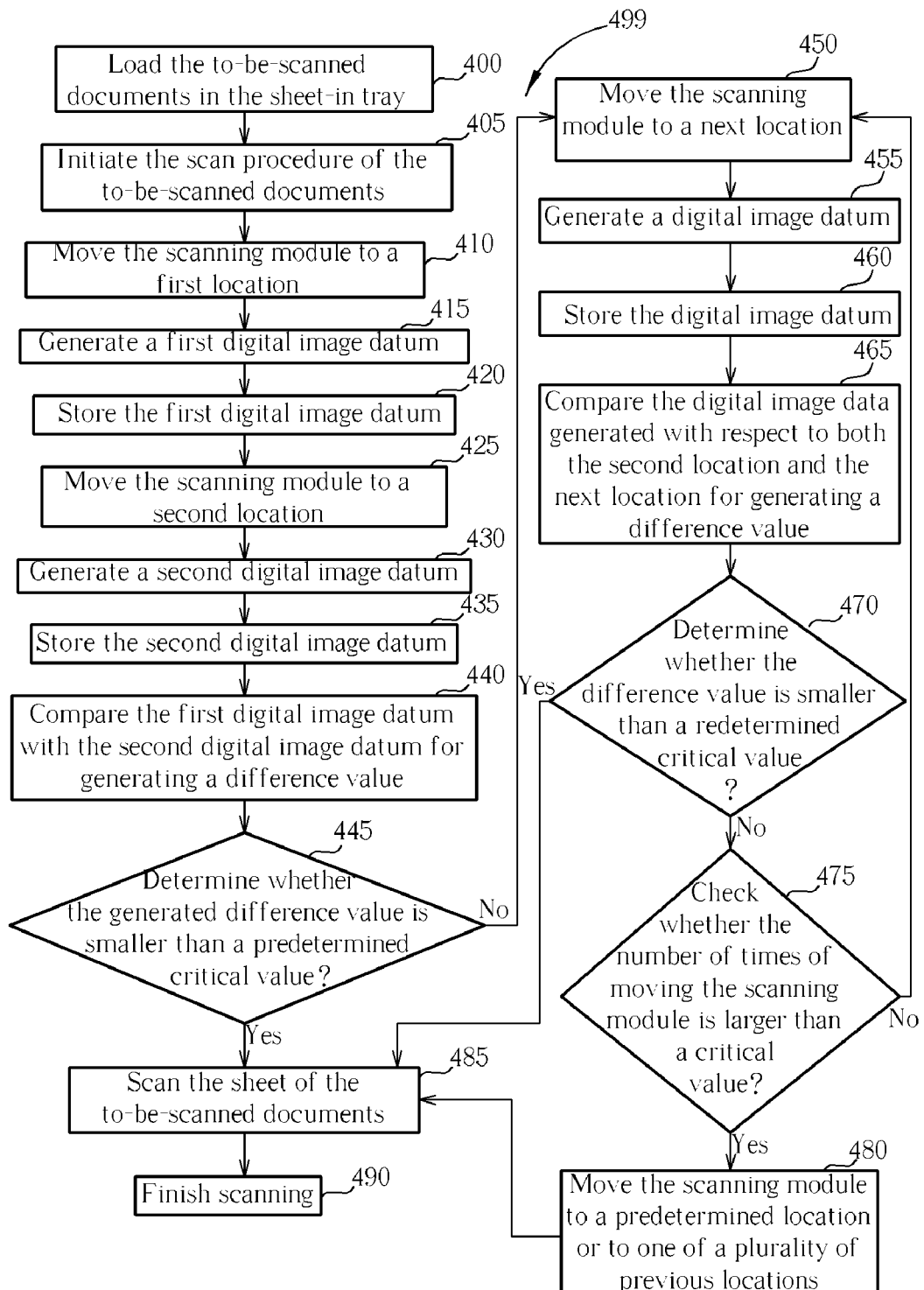
FIG. 4 is a diagram of a procedure of the scanning method according to a preferred embodiment of the present invention.

Please refer to FIG. 4, which is a diagram of a procedure 499 of the scanning method according to a preferred embodiment of the present invention, where the procedure 499 may be regarded as a summary of the abovementioned descriptions of the scanning method of the present invention. The procedure 499 includes steps as follows:

Step 400: Load the to-be-scanned documents 320 in the sheet-in tray 315 of the scanner 300.

Step 405: Initiate the scan procedure for the to-be-scanned documents 320.

Step 410: Control the second motor driving circuit 359 with the microprocessor 357 of the control circuit 355 to drive the second motor 360 to move the scanning module 345 to a first location.

Step 415: Generate a first analog image datum by scanning a sheet of the to-be-scanned documents 320 with the scanning module 345 at the first location and transform the first analog image datum generated by the photoelectric transforming element 346 into a first digital image datum with the analog-to-digital converter 347.

Step 420: Store the first digital image datum in the memory 350.

Step 425: Control the second motor driving circuit 359 with the microprocessor 357 of the control circuit 355 to drive the second motor 360 to move the scanning module 345 to a second location.

Step 430: Generate a second analog image datum by scanning the sheet of the to-be-scanned documents 320 with the scanning module 345 at the second location and transform the second analog image datum generated by the photoelectric transmitting element 346 into a second digital image datum with the analog-to-digital converter 347.

Step 435: Store the second digital image datum in the memory 350.

Step 440: Compare the first digital image datum with the second digital image datum by the microprocessor 357 of the control circuit 355 for generating a difference value.

Step 445: Determine whether the generated difference value is smaller than a predetermined critical value with the microprocessor 357 of the control circuit 355. When the difference value is smaller than the predetermined critical value, go to step 485. Otherwise, go to Step 450.

Step 450: Control the second motor driving circuit 359 with the microprocessor 357 of the control circuit 355 to drive the second motor 360 to move the scanning module 345 to a next location from the second location.

Step 455: Generate an analog image datum by scanning the sheet of the to-be-scanned documents 320 with the scanning module 345 at the next location and transforming the analog image datum generated by the photoelectric transmitting element 346 into a digital image datum with the analog-to-digital converter 347.

Step 460: Store the digital image datum in the memory 350.

Step 465: Compare the digital image data generated with respect to the second location and the next location with the microprocessor 357 of the control circuit 355 for generating a difference value.

Step 470: Determine whether the difference value generated in Step 465 is smaller than a predetermined critical value with the microprocessor 357 of the control circuit 355. When the difference value is smaller than the predetermined critical value, go to Step 485. Otherwise, go to Step 475.

Step 475: When the number of times of moving the scanning module 345 is larger than a critical value, go to Step 480. Otherwise, go to Step 450.

Step 480: Control the second motor driving circuit 359 to drive the second motor 360 to move the scanning module 345 to a predetermined location or to one of a plurality of previous locations, where the scanning module 345 has reached during scanning the sheet of the to-be-scanned documents 320.

Step 485: Control the first motor driving circuit 358 with the microprocessor 357 of the control circuit 355 to drive the first motor 330 to rotate the roller 325 to move the sheet of the to-be-scanned documents 320 along a Y-axis utilized by the scanning module 345 and across the transparent platform 335 so that the sheet of the to-be-scanned documents 320 may be scanned by the scanning module 345.

Step 490: Repeat Step 485 until all sheets of the to-be-scanned documents 320 are scanned.

According to another preferred embodiment of the present invention, the procedure 499 may further be adapted in a manner described later. Since the scanning module 345 scans lines one by one along a Y-axis, where each of the scanned lines stretches parallel to a X-axis orthogonal to the Y-axis and has a plurality of pixels. In Step 440, the microprocessor 356 of the control circuit 355 compares the first digital image datum with the second digital image datum for outputting a difference value, which may be generated by calculating respective difference values or an accumulated difference value between the plurality of first pixels in the first digital image datum and the plurality of second pixels in the second digital image datum. That is, the microprocessor 357 of the control circuit 355 calculates a difference value between a first pixel and a second pixel, both of which lie on a Y-axis, or calculates an accumulated difference value between a plurality of first pixels and a plurality of second pixels corresponding to the plurality of first pixels, for generating the difference value. In Step 445, the microprocessor 357 determines whether the calculated difference value between the first digital image datum and the second digital image datum is not larger than a predetermined critical value.

Similarly, in Step 465, the microprocessor 357 compares the digital image datum at the second location and the digital image datum at the next location for generating a difference value, which may be generated by comparing pixels of the digital image datum at the second location and pixels of the digital image datum at the next location one by one, or by directly calculating an accumulated difference value between pixels of both the image data. In Step 470, whether the generated difference value is not larger than a predetermined critical value is determined.

Figure 5:
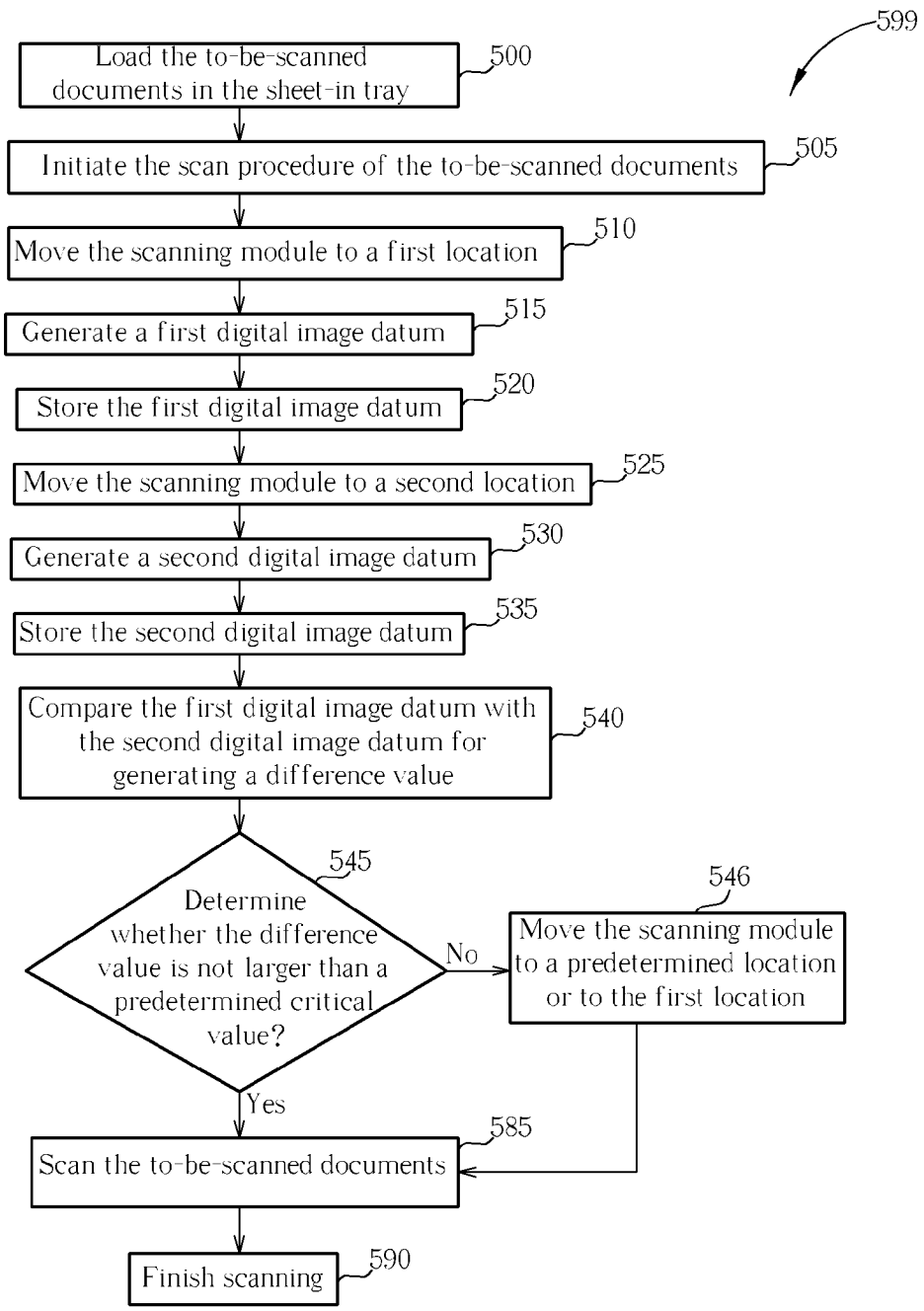
FIG. 5 is a diagram of a procedure according to another preferred embodiment of the present invention.

Please refer to FIG. 5, which is a diagram of a procedure 599 according to another preferred embodiment of the present invention. The procedure 599 includes steps as follows:

Step 500: Load the to-be-scanned documents in the sheet-in tray 315 of the scanner 300.

Step 505: Initiate the scan procedure for the to-be-scanned documents 320.

Step 510: Control the second motor driving circuit 359 with the microprocessor 357 to drive the second motor 360 for moving the scanning module 345 to a first location.

Step 515: Generate a first analog image datum by scanning at the first location of the scanning module 345 and transform the first analog image datum generated by the photoelectric transforming element 346 into a first digital image datum with the analog-to-digital converter 347.

Step 520: Store the first digital image datum in the memory 350.

Step 525: Control the second motor driving circuit 359 with the microprocessor 357 to drive the second motor 360 for moving the scanning module 345 to a second location.

Step 530: Generate a second analog image datum by scanning at the second location of the scanning module 345 and transforming the second analog image datum generated by the photoelectric transforming element 346 into a second digital image datum with the analog-to-digital converter 347.

Step 535: Store the second digital image datum in the memory 350.

Step 540: Compare the first digital image datum with the second digital image datum with the microprocessor 357 for generating a difference value.

Step 545: Determine whether the difference value is not larger than a predetermined critical value. When the difference value is not larger than the predetermined critical value, go to Step 585. Otherwise, go to Step 546.

Step 546: Control the second motor driving circuit 359 to drive the second motor 360 for moving the scanning module 345 to a predetermined location or to the first location.

Step 585: Control the first motor driving circuit 358 with the microprocessor 357 for driving the first motor 330 to rotate the roller 325 for moving the to-be-scanned documents 320 across the transparent platform 335 along a Y-axis so that the scanning module 345 can scan the to-be-scanned documents 320.

Step 590: Repeat Step 585 until the to-be-documents 320 are scanned completely.

The procedure 599 is described in detail as follows. The scanning module 345 scans along a Y-axis, where each image datum comprises a plurality of scan lines parallel to an X-axis orthogonal to the Y-axis and includes a plurality of pixels. In Step 540, the microprocessor 357 compares a first digital image datum with a second digital image datum for generating a difference value. The difference value may be generated according to difference values between a plurality of pixels of the first digital image datum and a plurality of pixels of the second digital image datum, or be generated according to an accumulated difference value between pixels of both the first image datum and the second image datum. In Step 545, the microprocessor 357 determines whether the generated difference value is not larger than a predetermined value.

In the abovementioned embodiments of the present invention, both the first motor 330 and the second motor 360 may be stepper motors or server motors, and may also be implemented with a same motor wringing with different gear wheels. Both the first motor driving circuit 358 and the second motor driving circuit 359 may be integrated into a same motor driving circuit on the control circuit 355, and both of the first motor 330 and the second motor 360 may be initiated and switched with the aid of a switch on the integrated motor driving circuit. The light source 340 may be utilized in a reflective manner or in a transmissive manner for scanning documents, and moves synchronously with the scanning module 345.

In summary, when there are dust grains adhering to the transparent platform 335 above or below, with the aid of the scanning method of the present invention, the scanning module 345 may still be moved to a location for scanning documents without being effected by the dust grains. Therefore, with the aid of the scanning method of the present invention, a scanner keeps an ideal scanning quality under non-ideal circumstances.

Those skilled in the art will readily observe that numerous modifications and alterations of the device and method may be made while retaining the teachings of the invention.

What is claimed is:

1. A scanning method for a scanner capable of selecting scanning positions, comprising:
    moving a scanning module to a first position to generate a first image datum;
    moving the scanning module to a second position to generate a second image datum;
    comparing the first image datum with the second image datum for calculating a difference between the first image datum and the second image datum; and
    scanning a document with the scanning module at one of the first scanning position and the second scanning position according to the calculated difference between the first image datum and the second image datum.

2. The method of claim 1 wherein the step of scanning the document with the scanning module at one of the first scanning position and the second scanning position according to the calculated difference between the first image datum and the second image datum comprises:
    moving the scanning module to the second position to scan the document when the calculated difference between the first image datum and the second image datum is not larger than a predetermined value.

3. The method of claim 1 wherein the step of scanning the document with the scanning module at one of the first scanning position and the second scanning position according to the calculated difference between the first image datum and the second image datum comprises:
    moving the scanning module to the first position to scan the document when the calculated difference between the first image datum and the second image datum is larger than a predetermined value.

4. The method of claim 1 wherein the step of moving the scanning module to the first position to generate the first image datum further comprises:
    moving the scanning module from a starting position to the first position for generating the first image datum.

5. A scanning method for a scanner capable of selecting scanning positions, comprising:
    moving a scanning module to a first position to generate a first image datum;
    moving the scanning module to a second position to generate a second image datum;
    comparing the first image datum with the second image datum for calculating a difference between the first image datum and the second image datum;
    moving the scanning module to a third position when the calculated difference between the first image datum and the second image datum is larger than a predetermined value;
    generating a third image datum at the third position with the scanning module;
    comparing the second image datum with the third image datum for calculating a difference between the second image datum and the third image datum; and
    scanning the document with the scanning module at one of the first scanning position, the second scanning position and the third scanning position according to the calculated difference between the second image datum and the third image datum.

6. The method of claim 5 wherein the step of scanning the document with the scanning module at one of the first scanning position, the second scanning position and the third scanning position according to the calculated difference between the second image datum and the third image datum comprises:
    moving the scanning module to the third position to scan the document when the calculated difference between the second image datum and the third image datum is not larger than the predetermined value.

7. The method of claim 5 wherein the step of scanning the document with the scanning module at one of the first scanning position, the second scanning position and the third scanning position according to the calculated difference between the second image datum and the third image datum comprises:
    moving the scanning module to one of the first position and the second position to scan the document when the calculated difference between the second image datum and the third image datum is larger than the predetermined value.

8. The method of claim 5 wherein the step of scanning the document with the scanning module at one of the first scanning position, the second scanning position and the third scanning position according to the calculated difference between the second image datum and the third image datum further comprises:
    moving the scanning module to a fourth position when the calculated difference between the second image datum and the third image datum is larger than the predetermined value.

9. A scanner with adaptable scanning positions comprising:
    a housing;
    a scanning window disposed on the housing;
    a scanning module disposed interior to the housing, in a movable manner, wherein when the scanning module is moved to a plurality of scanning positions, a corresponding plurality of image data is generated; and
    a control processing unit for controlling the scanning module and for processing the plurality of generated image data, wherein the control processing unit compares said plurality of generated image data, calculates differences between said plurality of generated image data, and moves the scanning module to a scanning position for scanning a document passing by the scanning window according to the calculated differences between said plurality of generated image data.

10. The scanner of claim 9 wherein the plurality of scanning positions comprises a first position and a second position, at both of which a first image datum and a second image datum are generated respectively with the scanning module.

11. The scanner of claim 10 wherein the first image datum is an image datum of a first scanning line and comprises a plurality of pixels; wherein the second image datum is an image datum of a second scanning line and comprises a plurality of pixels; wherein both the first scanning line and the second scanning line stretch along an X-axis.

12. The scanner of claim 11 wherein the control processing unit calculates a difference between a first pixel from the plurality of pixels of the first image datum and a second pixel from the plurality of pixels of the second image datum, and moves the scanning module to the scanning position according to the calculated difference between the first pixel and the second pixel, wherein the first pixel and the second pixel are on a Y-axis orthogonal to the X-axis.

13. The scanner of claim 11 wherein the control processing unit calculates an accumulated difference between the plurality of pixels of the first image datum and the plurality of pixels of the second image datum, and moves the scanning module to the scanning position according to the accumulated difference.

14. The scanner of claim 10 wherein when the difference between the first image datum and the second image datum is not larger than a predetermined value, the scanning position is located at the second position.

15. The scanner of claim 10 wherein when the difference between the first image datum and the second image datum is larger than a predetermined value, the scanning position is located at the first position, the second position, or a predetermined position.

16. The scanner of claim 9 wherein the scanner is a sheet-fed scanner, which comprises a sheet feeding unit for moving the document across the scanning window.

* * * * *